United States Patent Office 3,794,652
Patented Feb. 26, 1974

3,794,652
AMINOETHANESULFONYL DERIVATIVES
Shun-Ichi Naito, 35 Murasakino Kamitoridacho,
Kita-ku, Kyoto, Japan
No Drawing. Original application Mar. 9, 1970, Ser. No.
17,969, now Patent No. 3,709,889. Divided and this
application Aug. 25, 1971, Ser. No. 174,928
Claims priority, application Japan, May 8, 1969,
44/35,435, 44/35,436, 44/35,437
Int. Cl. C07d 31/48
U.S. Cl. 260—293.69
11 Claims

ABSTRACT OF THE DISCLOSURE

Stable, water-soluble aminoethanesulfonyl derivatives having analgesic activity or antilipemic action are described. They are prepared by ammonolysis of the corresponding halides, preferably under high pressure in the presence of a catalyst, or by deacylation of the corresponding acylamino or acylimino compound, or by nicotinoylation of an amino compound.

---

This application is a division of copending application Ser. No. 17,969, filed Mar. 9, 1970, now U.S. Pat. No. 3,709,889.

The present invention relates to novel aminoethanesulfonyl derivatives having the formula:

$$X-SO_2CH_2CH_2-Y \quad (I)$$

and pharmaceutically acceptable non-toxic acid addition salts thereof, wherein X is 2-pyridlamino 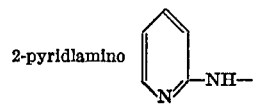

piperidino 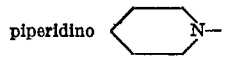

cyclohexylamino 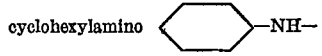

or pyrrolidino 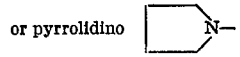

and Y is amino —$NH_2$ or nicotinoylamino

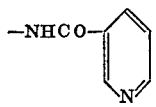

The compounds of the above Formula I are all novel and useful and have not heretofore been disclosed in the literature. They are useful as pharmaceuticals, particularly as analgesic drugs to relieve pain. Those in which X is piperidino or pyrrolidino exhibit antilipemic or cholesterol-lowering action and are therefore useful in the treatment of atherogenesis. Furthermore, the compounds of the present invention contain taurin as a fundamental skeleton therein. Taurin is one of the essential amino acids exhibiting surface active activity and the present compounds containing such a molecule as a skeleton do not decrease in their activity even when they are subjected to detoxication such as an acetylation in vivo by oral administration. This is a very characteristic property of all compounds of this invention. In addition, the present invention compounds are of low toxicity.

Another and important characteristic of these compounds is that they are very stable against humidity although all of them are comparatively soluble or very soluble in water. Furthermore, their aqueous solutions are stable, too. For example, only 2–10% of the compounds are decomposed even when a 10% aqueous solution is stored at room temperature for one year. This is very advantageous for practical purposes, particularly when used in the form of an injectible solution.

The present compounds can be prepared in various ways. For example, compounds in which Y=$NH_2$ can be produced by the reaction of X—$SO_2CH_2CH_2$—Z (II), wherein X is as defined above and Z is halogen, with ammonia.

The halogen Z may be chlorine, bromine, iodine, etc. and the use of chlorine is preferred. The ammonia may be used as its own state, namely as an ammonia gas or a liquid ammonia, or may be used as a solution, suspension, etc. in water and/or organic solvent; if desired, the ammonia may be in its acid-addition salt form. The above ammonolysis reaction may be carried out under ordinary pressure but preferably is carried out under high pressure in the presence of a catalyst. The use of such catalysts as NaI, $Cu_2Cl_2$, $NH_4I$, etc. are preferred.

The halides used as starting materials in this method are novel compounds forming part of the invention. They may be prepared by the reaction of, for example, 2-pyridylamine, piperidine, cyclohexylamine, or pyrrolidine with haloethylsulfonyl halide.

The above method is illustrated by the following non-limitative examples.

EXAMPLE 1

(X=piperidino, Y=$NH_2$)

Ten (10) grams of (II) (Z=Cl) are made to react with anhydrous ammonia or with aqueous ammonia and ammonium carbonate with heating in an autoclave in the presence of a catalyst. After the reaction, the mixture is made acidic with hydrochloric acid, the precipitates are removed by suction filtration, the filtrate is made slightly alkaline with sodium carbonate, then extracted with ethyl acetate, the extract is evaporated, and the residue is recrystallized from chloroform to give a desired product (I). M.P. 205–6° C. Details of the reaction are given in Table 1.

TABLE 1

| Ammonia materials | Reaction time, hours | Temperature, ° C. | Yield, percent | Catalyst used |
|---|---|---|---|---|
| Anhydrous ammonia. | 5 | 100 | 28 | NaI (0.45 g.) |
| Do | 5 | 100 | 33 | $Cu_2Cl_2$ (1.0 g.) |
| $Na_2CO_3$ (10 g.) and 28% $NH_4OH$ (20 ml.). | 8 | 140 | 30 | $Cu_2Cl_2$ (0.4 g.) |

Like reactions are carried out using (II) in which Z is bromine or iodine and it was found that the yields are somewhat lowered. The absence of catalysts are also found to decrease the yields.

In another embodiment, 10 g. of (II) (Z=Cl) are made to react with anhydrous ammonia or with aqueous ammonia and ammonium carbonate with heating in an autoclave in the presence of a catalyst, the mixture in the autoclave is made acidic with hydrochloric acid, the precipitates are removed by suction filtration, the filtrate is evaporated to dryness, and the residue is recrystallized from ethanol to give the hydrochloride of the desired product. M.P. 173–185° C. (decomposition with effervescence). When this is further treated with an alkali, the free product is obtained in high yield.

EXAMPLE 2A (X=2-pyridylamino, Y=$NH_2$)

Ten (10) grams of (II) (X=2-pyridylamino) are made to react with anhydrous ammonia or with aqueous ammonia and ammonium carbonate with heating in an autoclave in the presence of a catalyst, the mixture is then made acidic with hydrochloric acid, precipitates are removed by suction filtration, the filtrate is made alkaline with sodium carbonate, evaporated to dryness in vacuo, the residue is well extracted with ethyl acetate, the extract is evaporated, and the residue is recrystallized from ethylene dichloride to give the desired product. M.P. 137–140° C. Colorless crystals.

*Analysis.*—Calc'd for $C_7H_{11}N_3O_2S$ (percent): C, 41.79; H, 5.47; N, 20.90. Found (percent): C, 41.88; H, 5.38; N, 21.03.

Details of the reaction are given in Table 2.

TABLE 2

| Ammonia materials | Reaction time, hours | Temperature, °C. | Yields, percent Z=Cl | Yields, percent Z=Br | Catalysts |
|---|---|---|---|---|---|
| Anhydrous ammonia, 20 g | 5 | 100 | 86 | | NaI (0.45 g.). |
| Do | 5 | 100 | 92 | 80 | Cu₂Cl₂ (1.0 g.); |
| Na₂CO₃ (10 g.) and 28% NH₄OH (20 ml.) | 8 | 140 | 83 | | Cu₂Cl₂ (0.4 g.). |
| Anhydrous ammonia | 120 | (¹) | 80 | 75 | Not used. |

¹ Room temperature.

EXAMPLE 2B (X=2-pyridylamino, Y=NH₂)

Ten (10) grams of (II) (X=2-pyridylamino, Z=Cl) are made to react with anhydrous ammonia or with aqueous ammonia and ammonium carbonate in an autoclave with heating in the presence of a catalyst, the mixture is then made acidic with hydrochloric acid, the precipitates are removed by suction filtration, the filtrate is evaporated to dryness in vacuo, and the residue is recrystallized from ethanol to give the hydrochloride of the desired product. M.P. 221–223° C. This is further treated with an alkali to give the free product in high yield. When this reaction is carried out with (II) where Z is bromine or iodine or carried out in the absence of a catalyst, the product is similarly obtained though the yield is somewhat lowered.

EXAMPLE 3

(X=cyclohexylamino or pyrrolidino, Y=NH₂)

Ten (10) grams of (II) (Z=Cl) are made to react with anhydrous ammonia or with aqueous ammonia and ammonium carbonate in an autoclave with heating in the presence of a catalyst, the mixture is made acidic with hydrochloric acid, the precipitates are removed by suction filtration, the filtrate is evaporated to dryness in vacuo, and the residue is recrystallized from ethanol to give the hydrochloride of the product. Or, the filtrate is made alkaline (pH about 9) with sodium carbonate, extracted with ethyl acetate, the extract is evaporated, and the residue is recrystallized from chloroform to give the free product. Or, the filtrate is made alkaline with sodium carbonate, evaporated to dryness in vacuo, and the residue is recrystallized from water to give the free product. Melting points and details of the reaction are given in Table 3 and in Table 4, respectively.

TABLE 3

| X | M.P. of free product | M.P. of the hydrochloride |
|---|---|---|
| Cyclohexylamino (Ia) | 226° C. (colorized and decomposed). | 177–184° C. |
| Pyrrolidino (Ib) | 170–173° C | 320–322° C. (colorized and decomposed). |

All the products are colorless crystals.

When the above reactions are carried out using the corresponding bromide (Z=Br) or iodide (Z=I) as starting materials, the yields are somewhat lowered. The absence of catalysts also lowers the yield.

Manufacture of amino compounds by the ammonolysis of the corresponding halide is given above. The desired product (I) where Y=NH₂ may also be prepared by the deacylation of the corresponding acylamino or acylimino compounds. Thus, the Compound I were Y=NH₂ can be manufactured by hydrolysis or hydrazine decomposition of a compound having the general formula $$X-SO_2CH_2CH_2-R \qquad (III)$$

wherein X is the same as defined above and R is an acylamino or acylimino group.

As acylamino groups, such aliphatic acylamino groups as acetylamino, propionylamino, etc. and aromatic acylamino groups as benzoylamino, nicotinoylamino, etc. may advantageously be used. As acylamino groups, such groups as the phthalimino group are useful. These examples illustrate the present invention but the present invention is not limited thereto.

In the hydrolysis reaction, such known hydrolysis techniques as the use of acid, sodium, sodium alcoholates, alkali hydroxides, alkali carbonates, etc. may advantageously be used. The use of alkali hydroxides, particularly the use of a concentrated solution of NaOH or KOH, is most preferred.

In deacylating by hydrazine decomposition, hydrazine hydrate is added to (III) in ethanol or in methanol and then the mixture is treated with hydrochloric acid to give the desired product. Other and modified techniques may also be applied advantageously.

The starting materials (III) used in this method are also novel compounds and may, for example, be synthesized by the reaction of 2-aminopyridine, piperazine, cyclohexylamine, or pyrrolidine with the corresponding acylaminoethanesulfonyl halide.

This deacylation method is illustrated by the following non-limitative examples.

EXAMPLE 4A (X=Piperidino, Y=NH₂)

To 42 grams of (III) (X=piperidino, R=phthalimino) are added 300 ml. of 30 w./v.% NaOH solution, the mixture is heated to reflux for 3 to 5 hours, allowed to cool, then acidified with conc. HCl with ice-cooling, and made slightly alkaline with sodium carbonate. The crystals separated thereby are kept for further purification. The filtrate is extracted with ethyl acetate, the extract is evaporated, the resulting residue is combined with the previously obtained crystals, and the whole is repeatedly recrystallized from chloroform to give 10 grams of the title product. Colorless needles, M.P. 205–207° C.

TABLE 4

| Ammonia materials | Reaction time, hours | Temperature, °C. | Yields, percent (Ia) | Yields, percent (Ib) | Catalysts |
|---|---|---|---|---|---|
| Anhydrous ammonia (20 g.) | 5 | 100 | 55 | 40 | NaI (0.45 g.) |
| Do | 5 | 100 | 56 | 41 | Cu₂Cl₂ (1.0 g.) |
| Na₂CO₃ (10 g.) and 28% NH₄OH (20 ml.) | 8 | 100 | 46 | 32 | Cu₂Cl₂ (0.4 g.) |

*Analysis.*—Calcd.: for $C_7H_{16}N_2O_2S$ (percent): C, 43.75, H, 8.33, N, 14.58. Found (percent): C, 43.80, H, 8.28, N, 14.41.

The same reactions are carried out using (III) where Y is benzoylamino and acetylamino to give the desired title products in yields of 4 grams and 2 grams, respectively. Similar products can also be prepared by the use of (II) where Y is propionylamino and nicotinoylamino groups.

The thus prepared compounds can, if necessary, be converted to acid addition salts by treatment with various inorganic and organic acids. Such salts can also be used for the purpose of the purification of the products. For example, the crude product is once converted to the salt and the salt is returned to the free amine which is obtained as a pure compound. One of such embodiments is that the reaction product obtained above is treated with conc. HCl with ice-cooling, then made slightly acidic with sodium carbonate, and the mixture is concentrated in vacuo to give a hydrochloride (M.P. 173–185° C.) of the product which is further treated with an alkali to give a purified product of M.P. 205–207° C.

Non-limitative examples of the hydrazine decomposition are as follows:

EXAMPLE 4B (X=Piperidino, Y=NH₂)

To 10 grams of (III) (where X=piperidino, R=phthalimino) are added 100 ml. of ethanol and the mixture is heated to reflux for 2 3 hours with 1.6 g. of hydrazine hydrate (approx. 100%). The mixture is then adjusted to pH about 1 with HCl, heated on a steam bath for 30 minutes more, filtered when hot to remove the separated phthalic hydrazide, and the filtrate is cooled to give the hydrochloride of the product. Or, this filtrate is made alkaline with Na₂CO₃, evaporated to dryness, the residue is extracted with warm methanol, the extract is strongly cooled, filtered to remove the separated mass, methanol is removed from the filtrate, and the residue is repeatedly recrystallized from chloroform to give the desired product. Colorless needles, M.P. 205–207° C. Yield 1.8 grams. This is identical with the product obtained in Example 4A.

EXAMPLE 5A (Y=NH₂)

To (III) (where R=phthalimino) is added 30 w./v.% NaOH solution and the mixture is heated to reflux for 3 to 5 hours. After cooling, this is acidified with conc. HCl with ice-cooling, adjusted to pH about 9 with Na₂CO₃, and filtered to separate into the crystals and the filtrate. The filtrate is extracted with ethyl acetate or with chloroform, the extract is evaporated, the residue is combined with the previously-obtained crystals, and the mixture is repeatedly recrystallized from water to give the desired product. Details of the above reaction are given in Table 5.

Similar reactions are carried out using (III) (where R=benzoylamino and acetylamino) and the desired products are obtained. Details are given in Table 6.

Results of the elementary analysis of the thus prepared products are given in Table 7.

TABLE 5

| X of (III) | Melting point of the products, ° C. | Yield, g. | Recrystallization solvents |
|---|---|---|---|
| 2-pyridylamino | 137–140 | 3.0 | Ethylene dichloride. |
| Cyclohexylamino | ¹ 226 | 2.8 | Water. |
| Pyrrolidino | 170–173 | 2.5 | Do. |

¹ Colorized and decomposed.

The amount of the NaOH solution used is 80 ml. All the products are colorless crystals.

TABLE 6

| X | R | Amt. of (III) used, g. | Yields, g. |
|---|---|---|---|
| 2-pyridylamino | Benzoylamino | 10 | 5.3 |
| Do | Acetylamino | 10 | 4.7 |
| Cyclohexylamino | Benzoylamino | 10 | 4.9 |
| Do | Acetylamino | 10 | 5.8 |
| Pyrrolidino | Benzoylamino | 10 | 3.5 |
| Do | Acetylamino | 10 | 3.0 |

TABLE 7

| X | Molecular formula | Calculated, percent | | | Found, percent | | |
|---|---|---|---|---|---|---|---|
| | | C | H | N | C | H | N |
| 2-pyridylamino | $C_7H_{11}N_3O_2S$ | 41.79 | 5.47 | 20.90 | 41.88 | 5.38 | 21.03 |
| Cyclohexylamino | $C_8H_{18}N_2O_2S$ | 46.60 | 8.74 | 13.59 | 46.77 | 8.71 | 13.45 |
| Pyrrolidino | $C_6H_{14}N_2O_2S$ | 40.45 | 7.87 | 15.73 | 40.32 | 7.91 | 15.88 |

EXAMPLE 5B (Y=NH₂)

To (III) (R=phthalimino) is added about 5 to 8 volumes of ethanol, then 1.1 times (III) molar amount of hydrazine hydrate (approx. 100%) is added, the mixture is heated to reflux on a steam bath for about 3 hours with stirring, adjusted to pH about 1 with HCl, heated on a steam bath for 30 minutes more, phthalic hydrazide is removed by filtration when the mixture is still hot, and the filtrate is cooled to collect the hydrochloride of the product. This is purified by repeated recrystallization. Details are given in Table 8. Results of elementary analysis are given in Table 9.

Such hydrochlorides may also be obtained by the method as given in Example 5A provided that the amount of sodium carbonate used for alkalinization is so small that the mixture is kept still slightly acidic.

TABLE 8

| X | Amt. of (III) used, g. | Amt. of hydrazine hydrate added, g. | M.P. of hydrochloride, ° C. | Yield, g. | Recrystallization solvent |
|---|---|---|---|---|---|
| 2-pyridylamino | 116.0 | 20.0 | 221–223 | 45.0 | Ethanol. |
| Cyclohexylamino | 130.0 | 22.0 | 177–184 | 45.0 | Do. |
| Pyrrolidino | 120 | 22.0 | ¹ 320–321.5 | 38.0 | Do. |

¹ Colorized and decomposed.

TABLE 9

| X | Molecular formula | Calculated, percent | | | Found, percent | | |
|---|---|---|---|---|---|---|---|
| | | C | H | N | C | H | N |
| 2-pyridylamino | $C_7H_{13}N_3O_2SCl_2$ | 30.66 | 4.74 | 15.33 | 30.70 | 4.81 | 15.55 |
| Cyclohexylamino | $C_8H_{19}N_2O_2SCl$ | 39.51 | 7.82 | 11.52 | 39.38 | 7.93 | 11.60 |
| Pyrrolidino | $C_6H_{15}N_2O_2SCl$ | 33.49 | 6.98 | 13.02 | 33.52 | 6.81 | 13.23 |

These hydrochlorides can be converted to the free aminoethanesulfonyl derivatives as given in Table 5 by All the products are colorless crystals.

TABLE 11

| X | Molecular formula | Analysis of (V), percent | | | | | | Analysis of (V. HCl), percent | | | | | |
|---|---|---|---|---|---|---|---|---|---|---|---|---|---|
| | | Calculated | | | Found | | | Calculated | | | Found | | |
| | | C | H | N | C | H | N | C | H | N | C | H | N |
| 2-pyridylamino | $C_{13}H_{14}N_4O_3S$ | 50.98 | 4.58 | 18.30 | 50.91 | 4.60 | 11.23 | 41.16 | 4.22 | [1] 14.78 | 41.30 | 4.18 | 14.95 |
| Cyclohexylamino | $C_{14}H_{21}N_3O_3S$ | 54.02 | 6.75 | 13.50 | 53.95 | 6.82 | 13.66 | 48.28 | 6.32 | 12.07 | 48.40 | 6.22 | 12.15 |
| Piperidino | $C_{13}H_{19}N_3O_3S$ | 52.53 | 6.40 | 14.14 | 52.76 | 6.35 | 14.21 | 46.71 | 5.99 | 12.57 | 46.68 | 6.05 | 12.68 |
| Pyrrolidino | $C_{12}H_{17}N_3O_3S$ | 50.88 | 6.01 | 14.84 | 50.68 | 5.98 | 14.95 | 45.00 | 5.63 | 13.13 | 45.11 | 5.50 | 13.32 |

[1] Dihydrochloride.

the following method. Thus, they are dissolved in water, the solution is adjusted to pH about 9 with $Na_2CO_3$, evaporated to dryness, and the residue is recrystallized from water. When X is the 2-pyridylamino group, the product is to be preferably recrystallized from ethylene dichloride instead of water.

Manufacture of the product by ammonolysis of the corresponding halide or by deacylation of the corresponding acylamino or acylimino compound is given above in detail. The Compond I where Y is nicotinoylamino can be manufactured by nicotinoylation of the corresponding (I) where Y is $NH_2$. It may be represented by the following reaction.

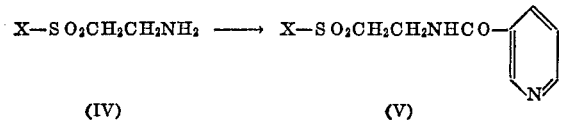

$X—SO_2CH_2CH_2NH_2 \longrightarrow X—SO_2CH_2CH_2NHCO—$ (IV)         (V)

where X is the same as already defined.

Various known nicotinoylation techniques can be applied to the above method. For examples, the use of an acid having a nicotinoyl group and its functional derivatives, such as an acid anhydride, ester, halide, or mixture thereof, are preferred. Such acid and its functional derivatives may be in a form of a salt. The reaction may be carried out at room temperature or under warming or heating under ordinary or high pressure according to the kinds and amount of reactants. The starting material (IV) may also be in a form of a salt.

This method is illustrated by the following non-limitative examples.

EXAMPLES 6A

To 0.1 mol of (IV) or its hydrochloride are added 100 to 200 ml. of pyridine, the mixture is warmed for 1 hour with 0.1 mol of nicotinic chloride hydrochloride (or allowed to stand at room temperature overnight and warmed for 1 hour more), pyridine is evaporated therefrom in vacuo, and the residue is repeatedly recrystallized from methanol or ethanol to give the hydrochloride of the desired (V). To the residue after evaporation of pyridine is added water, the mixture is made alkaline (pH about 9) with $Na_2CO_3$, then evaporated to dryness in vacuo, and the residue is recrystallized from water to give the desired (V). Melting points and yields of them are given in Table 10. Elementary analysis data are given in Table 11.

When the crude product (V) is, for example, dissolved in methanol or in ethanol and hydrochloric acid gas is bubbled therein or such alcoholic solution is treated with hydrochloric acid, the corresponding hydrochloride is easily formed. Thus, the crude product (V) can be purified via the hydrochloride.

TABLE 10

| X | Yield of the product (V), percent | M.P. of the product (V), °C. | M.P. of the hydrochloride (V. HCl), °C. |
|---|---|---|---|
| 2-pyridylamino | 75 | 332–349 | 314–325 |
| Cyclohexylamino | 80 | [1] 380 | [2] 335–338 |
| Piperidino | 60 | 220–225 | 269–270 |
| Pyrrolidino | 55 | >330 | [2] 316–325 |

[1] Colorized and blistered.
[2] Colorized.

The use of nicotinic chloride instead of nicotinic chloride hydrochloride has no influence on the yield of the product. The condensation reaction of starting material (IV) or its acid addition salt with nicotinic halide proceeds in water or in various organic solvents as well as in pyridine. It has also been confirmed that the reaction proceeds advantageously when a small amount of alkali or pyridine is added to water or other organic solvents.

For example, 500 ml. of ethyl acetate are added to 0.1 mol of the starting material (IV) or its hydrochloride, 0.1 mol of nicotinic acid chloride hydrochloride is added thereto, the mixture is heated to reflux on a steam bath for 3 hours, ethyl acetate is evaporated from the reaction mixture, and the resulting yellowish white solid is recrystallized from ethanol or from methanol to give the hydrochloride of the desired Compound V. Or, the above solid is dissolved in a small amount of water, the solution is made alkaline (pH about 9) with $Na_2CO_3$, water is evaporated therefrom in vacuo, and the residue is recrystallized from water to give pure product (V). Yields of the products in the above reactions are almost the same as those given in Table 10.

The use of nicotinic acid anhydride and nicotinic acid instead of nicotinic acid chloride (hydrochloride) has also been carried out. Some embodiments are given in the following Examples 6B and 6C.

EXAMPLE 6B

A mixture of 0.1 mol of starting material (IV), 0.1 mol of nicotinic acid anhydride, and 100 ml. of pyridine (anhydrous) is placed in a three-necked flask and stirred for 7 hours on a boiling water bath. Pyridine is evaporated therefrom in vacuo and the residue is made alkaline with a saturated aqueous solution of sodium carbonate to give a yellowish mass. The mixture is evaporated in vacuo to remove water and the residue is repeatedly recrystallized from water to pure product (V). Such products are identical with the authentic samples already manufactured by other methods. Details of the above reactions are given in Table 12.

EXAMPLE 6C

A mixture of 0.1 mol of starting material (IV), 0.1 mol of nicotinic acid, and 400 ml. of p-cymene is placed in a three-necked flask equipped with a water-remover and heated at 180–190° C. for about 6 hours with stirring. The resulting water is removed by azeotropic distillation. After cooling, the p-cymene is removed in vacuo. The residue is dissolved in the minimum volume of water, the solution is made alkaline (pH about 9) with sodium carbonate, water is removed in vacuo, and the residue is repeatedly recrystallized from water to give pure product (V) which is found to be identical with an authentic sample. Details are given in Table 12.

TABLE 12

| | Example 6B | | Example 6C | |
|---|---|---|---|---|
| X | Melting point, °C. | Yield, percent | Melting point, °C. | Yield, percent |
| 2-pyridylamino | 335–348 | 70 | 336–349 | 72 |
| Cyclohexylamino | [1] 378 | 63 | [1] 380 | 60 |
| Piperidino | 222–225 | 65 | 221–225 | 63 |
| Pyrrolidino | [2] >330 | 50 | [2] >330 | 71 |

[1] Colorized and blistered.
[2] Confirmed by converting to the hydrochloride (M.P. 316–325° C. [colorized]).

The present reaction may also be carried out in the presence of a catalyst.

The nicotinoylaminoethanesulfonyl derivatives (V) possessing a nicotinic pyridine ring in the skeleton and the nitrogen atom in said ring show basicity. Therefore, the resulting (V) may, if desired, be made to react with various inorganic and organic acids to convert to the corresponding acid-addition salts. Thus, not only such inorganic salts as the hydrochloride but also such organic salts as the fumarate, flavanate, tartrate, etc. may be manufactured and, for the purpose of purification of the product (V), such salts can advantageously be applied. For example, conc. hydrochloric acid is added to (V) and the mixture is evaporated to dryness in vacuo or HCl gas is introduced into a methanolic or ethanolic solution of (V) to give the hydrochloride easily. The resulting hydrochloride is recrystallized from methanol or ethanol so that purification is easily carried out.

What is claimed is:

1. A compound of the formula:

$$X-SO_2CH_2CH_2-R$$

wherein

X is 2-pyridylamino, piperidino, cyclohexylamino or pyrrolidino, and

R is acetylamino, propionylamino, benzoylamino, nicotinoylamino, or phthalimino.

2. The compound according to claim 1 wherein X is 2-pyridylamino and R is nicotinoylamino.

3. The compound according to claim 1 wherein X is cyclohexylamino and R is nicotinoylamino.

4. The compound according to claim 1 wherein X is piperidino and R is nicotinoylamino.

5. The compound according to claim 1 wherein X is pyrrolidino and R is nicotinoylamino.

6. The compound according to claim 1 wherein X is 2-pyridylamino and R is benzoylamino.

7. The compound according to claim 1 wherein X is cyclohexylamino and R is benzoylamino.

8. The compound according to claim 1 wherein X is pyrrolidino and R is benzoylamino.

9. The compound according to claim 1 wherein X is 2-pyridylamino and R is acetylamino.

10. The compound according to claim 1 wherein X is cyclohexylamino and R is acetylamino.

11. The compound according to claim 1 wherein X is pyrrolidino and R is acetylamino.

References Cited
UNITED STATES PATENTS 3,235,593  2/1966  Friedlander _____ 260—556
3,399,988  9/1968  Soong et al. _____ 71—94

HENRY R. JILES, Primary Examiner

G. T. TODD, Assistant Examiner

U.S. Cl. X.R.

260—293.61, 293.73, 293.85, 326 S, 294.8 F, 326.3, 556 A